US008880773B2

(12) United States Patent
Costa (10) Patent No.: US 8,880,773 B2
(45) Date of Patent: Nov. 4, 2014

(54) GUARANTEEING DETERMINISTIC BOUNDED TUNABLE DOWNTIME FOR LIVE MIGRATION OF VIRTUAL MACHINES OVER RELIABLE CHANNELS

(75) Inventor: Glauber Costa, Campinas (BR)

(73) Assignee: Red Hat, Inc., Raleigh, NC (US)

( * ) Notice: Subject to any disclaimer, the term of this patent is extended or adjusted under 35 U.S.C. 154(b) by 905 days.

(21) Appl. No.: 12/766,143

(22) Filed: Apr. 23, 2010

(65) Prior Publication Data

US 2011/0264788 A1 Oct. 27, 2011

(51) Int. Cl.
*G06F 21/00* (2013.01)
*G06F 9/50* (2006.01)
*G06F 9/48* (2006.01)

(52) U.S. Cl.
CPC ............ *G06F 9/5077* (2013.01); *G06F 9/4856* (2013.01)
USPC ................................ 711/6; 709/224; 709/226

(58) Field of Classification Search
CPC ........................................................ G06F 12/08
USPC .................... 709/224, 226; 711/112
See application file for complete search history.

(56) References Cited

U.S. PATENT DOCUMENTS

| 2007/0180436 | A1* | 8/2007 | Travostino et al. | ........... 717/138 |
| 2008/0163239 | A1* | 7/2008 | Sugumar et al. | ............. 718/105 |
| 2011/0066786 | A1* | 3/2011 | Colbert | ............................ 711/6 |

OTHER PUBLICATIONS

Christopher Clark; Live Migration of Virtual Machines, 2005; all pages.*
Costa, Glauber, "Patch 1/2 Add Non-Arbitrary Migration Stop Condition" http://article.gmane.org/gmane.comp.emulators.qemu/43705, May 21, 2009, 2 pgs.

\* cited by examiner

*Primary Examiner* — Glenford Madamba
(74) *Attorney, Agent, or Firm* — Lowenstein Sandler LLP (57) ABSTRACT

A mechanism for guaranteeing deterministic bounded tunable downtime for live migration of virtual machines (VMs) over reliable channels is disclosed. A method of the invention includes receiving a maximum downtime of a VM during a live migration of the VM from a source host machine to a destination host machine, determining a capacity of a network channel on which the VM is live migrated to the destination host machine, calculating a number of memory pages of the VM left to be transferred as part of the live migration before the VM is stopped, wherein the calculating of the number of memory pages is based on the received maximum downtime and the determined capacity of the network channel, and stopping the VM when the calculated number of memory pages remain to be transferred in order to transfer those memory pages to the destination host machine.

20 Claims, 4 Drawing Sheets

GUARANTEEING DETERMINISTIC BOUNDED TUNABLE DOWNTIME FOR LIVE MIGRATION OF VIRTUAL MACHINES OVER RELIABLE CHANNELS

TECHNICAL FIELD

The embodiments of the invention relate generally to virtualization systems and, more specifically, relate to guaranteeing deterministic bounded tunable downtime for live migration of virtual machines (VMs) over reliable channels.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Often times, a VM may need to be migrated from one host machine to another host machine for a variety of reasons. This migration process may be a live migrations process, referring to the fact that the VM stays running and operational (i.e., "live") during most of the migration process. During live migration, the entire state of a VM is transferred from one host machine to another host machine. A critical piece of this transmission of state is the transfer of memory of the VM. The entire memory of a VM can often times fall in the order of gigabytes, which can result in a length live migration transfer process. In addition, because the VM is "live" during this transfer, memory may become "dirty" during the transfer. This means that a particular page of the memory that was already transferred has been modified on the VM that is still residing on the source host. Typically, these "dirty" pages are marked so that those particular pages of memory can be transferred again during the live migration process.

One problem with the current state of live migration is that it is unknown how long the migration process may take. Current techniques of live migration will stop operation of the VM during the live migration transfer of memory when there is an arbitrary, fixed number of memory pages left to be transferred. This downtime is an unavoidable part of the live migration process. However, this downtime can be bounder by the heuristic of the number of memory pages left to be transferred. For example, current techniques may set a fixed number of pages, for example 20 pages, to be left before the operation of the VM is stopped and the remaining memory transfer completed to finalize the migration of the VM. Unfortunately, the knowledge of this fixed page number does not mean anything when trying to determine what the downtime of the VM will be. This is because the transfer time depends on the network connection. With an unreliable network connection, the transfer time is an unknown quantity, thereby limiting the effectiveness and reliability of the live migration process. Furthermore, when the number of pages is actually too few, then this number of pages may never be achieved as the pages get dirty too fast.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for guaranteeing deterministic bounded tunable downtime for live migration of virtual machines (VMs) over reliable channels. A method of embodiments of the invention includes receiving a maximum downtime of a VM during a live migration of the VM from a source host machine to a destination host machine, determining a capacity of a network channel on which the VM is live migrated to the destination host machine, calculating a number of memory pages of the VM left to be transferred as part of the live migration before the VM is stopped, wherein the calculating of the number of memory pages is based on the received maximum downtime and the determined capacity of the network channel, and stopping the VM when the calculated number of memory pages remain to be transferred in order to transfer those memory pages to the destination host machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "calculating", "stopping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for guaranteeing deterministic bounded tunable downtime for live migration of VMs over reliable channels. More specifically, embodiments of the invention measure channel speed during the live migration iterations and decide to stop a VM when it can be guaranteed that the channel has enough bandwidth to honor a downtime selectable by the user. Embodiments of the invention provide the ability for a user, such as a human or another machine, to determine, with, in some cases, a strict guarantee, how much downtime a VM will have during live migration of the VM. As such, it can be determined how long the process of live migration will take and, if it takes longer than this then the live migration can be aborted because it is known that the whole live migration process cannot be performed.

Figure 1:
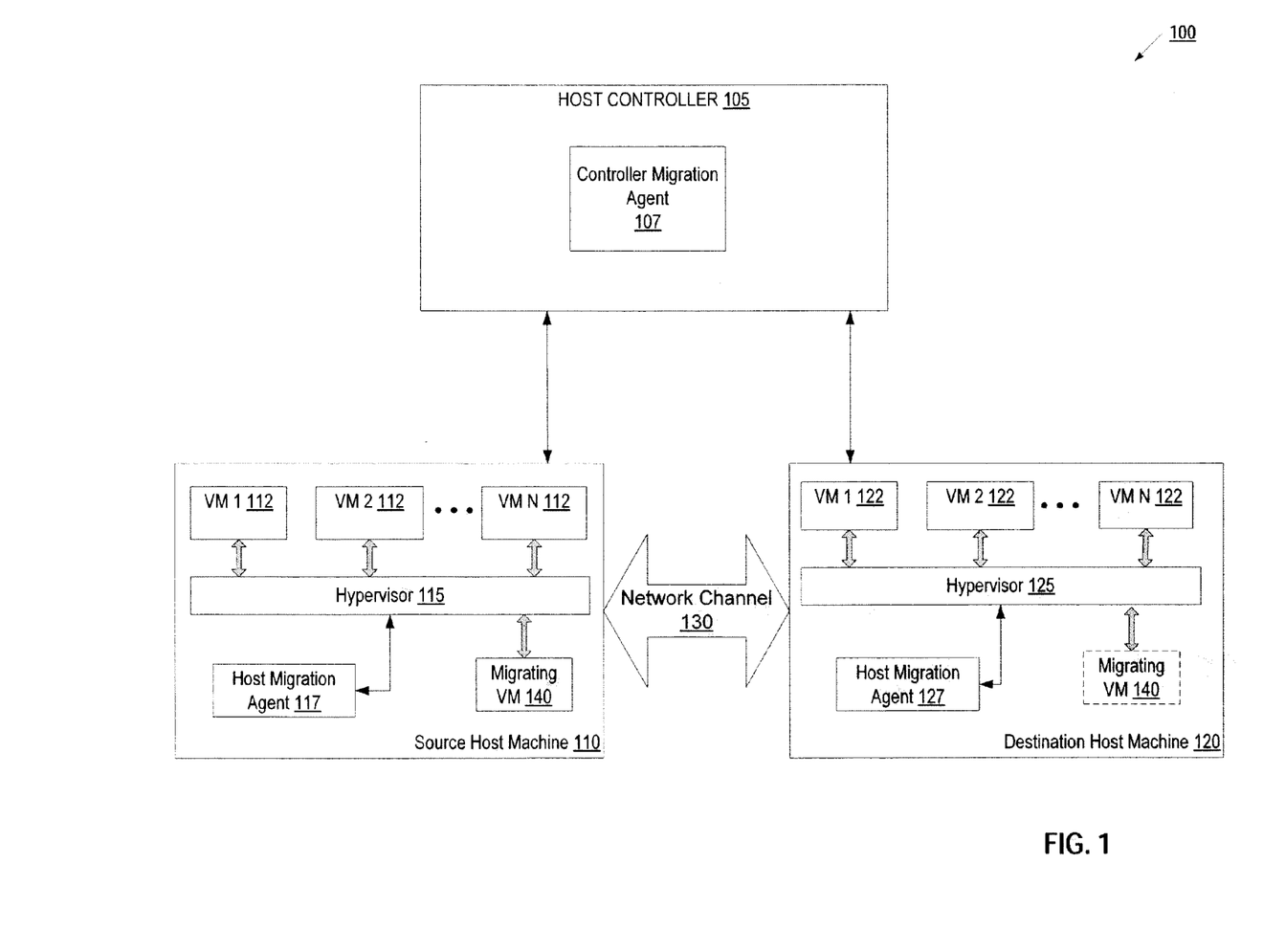
FIG. 1 is a block diagram of an exemplary virtualization architecture in which embodiments of the present invention may operate.

FIG. 1 illustrates an exemplary virtualization architecture 100 in which embodiments of the present invention may operate. The virtualization architecture 100 may include one or more host machines 110, 120 to run one or more virtual machines (VMs) 112, 122. Each VM 112, 122 runs a guest operating system (OS) that may be different from one another. The guest OS may include Microsoft Windows, Linux, Solaris, Mac OS, etc. The host 110, 120 may include a hypervisor 115, 125 that emulates the underlying hardware platform for the VMs 112, 122. The hypervisor 115, 125 may also be known as a virtual machine monitor (VMM), a kernel-based hypervisor or a host operating system.

In one embodiment, each VM 112, 122 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110, 120 as a local client. In one scenario, the VM 112, 122 provides a virtual desktop for the client.

As illustrated, the host 110, 120 may be coupled to a host controller 105 (via a network or directly). In some embodiments, the host controller 105 may reside on a designated computer system (e.g., a server computer, a desktop computer, etc.) or be part of the host machine 110, 120 or another machine. The VMs 112, 122 can be managed by the host controller 105, which may add a VM, delete a VM, balance the load on the server cluster, provide directory service to the VMs 112, 122, and perform other management functions.

In one embodiment, host controller 105 may include a controller migration agent 107 that is responsible for migration of a VM 122 between host machines 110, 120 via network channel 130. In addition, each host machine 110, 120 may include a host migration agent 117, 127 to assist controller migration agent 107 in the migration process, or to handle the migration process directly themselves. Migration agent 107, 117, 127 make a determination of which host machine 110, 120 to place a VM 112, 122 when it is migrated. In a virtualization system 100, it is important to schedule (also referred to as selection or placement) VMs 112, 122 on the "best host" 110, 120 for the job. There are various considerations for selecting the "best host". In one embodiment, migration agent 107, 117, 127 utilizes a general selection algorithm that considers a variety of factors for placement of a VM.

For purposes of the following explanation, host machine 110 may be known as the source host machine 110 from which a VM 140 is migrating from, and host machine 120 may be known as the destination host machine 120 to which the VM 140 is migrating to. Assume VM 140 on source host machine 110 is live migrating to destination host machine 120. Embodiments of the invention measure channel speed of network channel 130 during the live migration iterations and decide to stop the VM 140 when it can be guaranteed, or in some cases estimated to a high probability, that the network channel 130 has enough bandwidth to honor a downtime selectable by a user.

In embodiments of the invention, when it is decided to initiate a live migration process for VM 140 between source host machine 110 and destination host machine 120, the state of VM 140 will be transferred between the two host machines 110, 120. VM 140 remains operational on source host machine 110 during this transfer of state. The largest portion of the state of VM 140 to be transferred is its memory. The live migration process transfers as much of the memory as possible, but, at some point, it is inevitable that the VM 140 should be stopped in order to finish the memory transfer process.

Embodiments of the invention have the migration agent 107, 117 determine the capacity of the network channel 130 during the transfer of initial memory that takes place in live migration. In some embodiments, this capacity is determined by the time a transfer of a memory page takes to reach the destination host machine 120 and to receive an acknowledgment in return from the destination host machine 120. Multiple iterations of initial memory transfers may be utilized to make the determination of network channel 130 capacity. In some embodiments, the network channel 130 property information may be stored in the source host machine 110.

Once the network channel 130 capacity is determined, migration agent 107, 117 provides a configuration interface to an end user (e.g., a human or another machine) for them to specify the maximum downtime of the live migration (e.g., 30-35 ms). In other embodiments, a default downtime may be used for the live migration. Based on the downtime, the migration agent 107, 117 then determines how many memory pages should be left when the live migration process should be stopped. This parameter is then utilized by the migration agent 107, 117 in the live migration process to stop the VM in order to complete the transfer. This determination is a function of the previously-determined round-trip time of message in the network channel 130.

For example, if an end user specifies that the maximum downtime for the live migration is to be 35 ms, and the determined network channel 130 capacity is 0.35 ms per memory page transfer, then it can be determined that to guarantee a maximum downtime of 35 ms the VM 140 should be stopped with 100 pages left to transfer. The larger the specified downtime is, the quicker the live migration process will go and vice versa. This is because the smaller the downtime, the longer the live migration process takes to converge (or not converge at all) due to the dirtying of memory pages while the VM 140 is operational. If there is only a short time period of downtime specified, then there will be a smaller number of memory pages left when the VM should be stopped, meaning there are more memory pages to be transferred during the live portion of the migration and thereby more opportunities for memory pages to become dirty and have to be transferred again.

It should be noted that embodiments of the invention provide a simplified solution for a small portion of the live migration process. As memory is not the only thing transferred during live migration, the downtime of the VM may also include time to transfer other state (than memory) of the VM. Typically, the downtime for these "other states" is easily determinable. For example, if a user asks for 40 ms of downtime and it is known that all other state is transferable in 5 ms, and it take 0.35 ms to transfer a page, then the operation of the VM may be stopped when there is 100 pages left.

Embodiments of the invention can provide a guaranteed downtime when the network channel 130 is reliable (i.e., does not vary), such as with hardware internal buses for Ethernet-based networks. A reliable network channel 130 means that there is an upper bound for the round trip time a message takes to travel in the channel 130.

Embodiments of the invention may not be as reliable when the upper bound capacity of the network channel 130 cannot be determined with accuracy. This is because the accuracy of embodiments of the invention depends on the external load on the network channel 130. However, in the case where the network channel 130 is not reliable, empirical parameters may be established for the network channel's 130 upper-bound capacity. The empirical parameter may be based on multiple iterations of memory transfer time measurements over the network channel 130. A mean and standard deviation of the message round-trip time on the channel 130 during these iterations is determined and used for the network channel 130 capacity parameter. In this case, the guarantee of VM downtime is only as good as the approximation, and as such is only a statistical guarantee.

Figure 2:
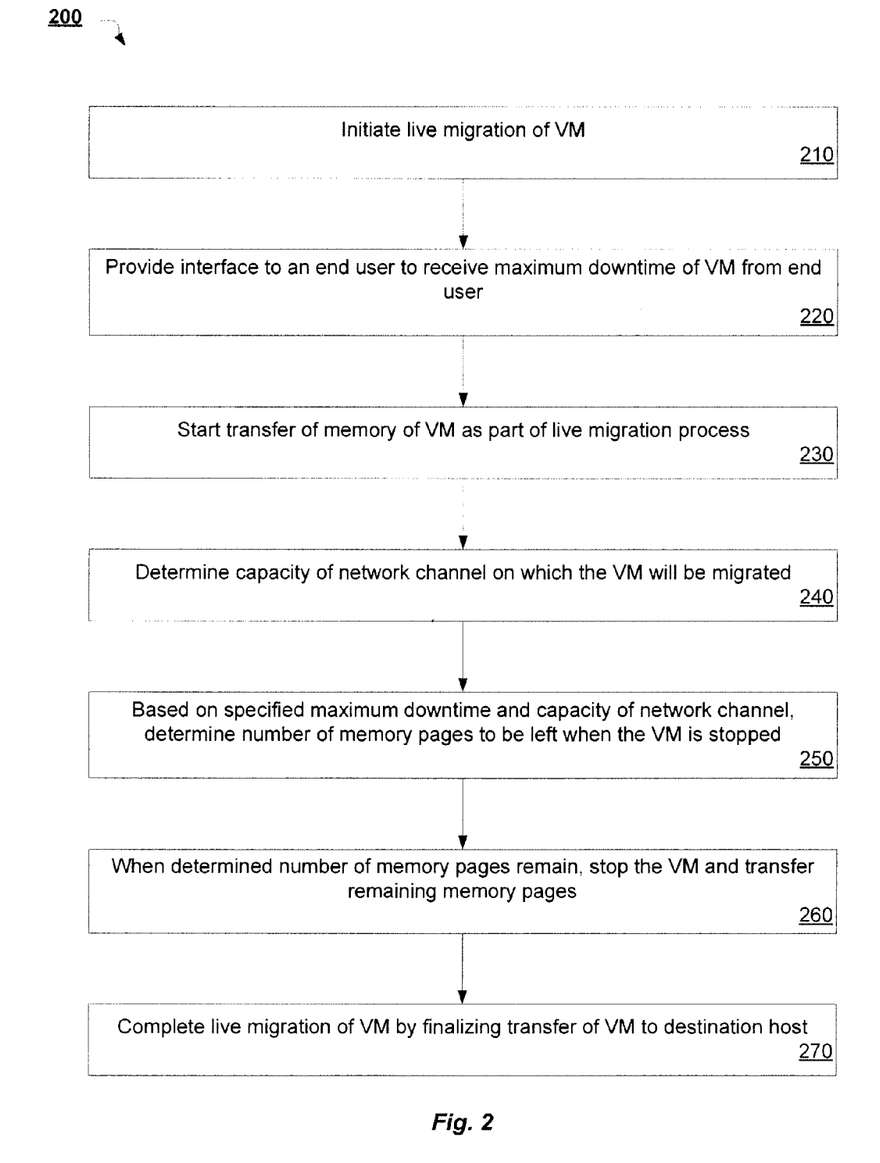
FIG. 2 is a flow diagram illustrating a method for guaranteeing deterministic bounded tunable downtime for live migration of VMs over reliable channels according to an embodiment of the invention.

FIG. 2 is a flow diagram illustrating a method 200 for guaranteeing deterministic bounded tunable downtime for live migration of VMs over reliable channels according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by source host machine 110 of FIG. 1.

Method 200 begins at block 210 where live migration of a VM is initiated. In some embodiments, live migration is initiated upon the triggering of some predetermined parameter being met, such as memory capacity on a VM exceeding a threshold. At block 200, an interface is provided to an end user in order to receive a maximum downtime for the migrating VM from the end user. In some embodiments, a migration agent provides this interface to the end user or another process. Subsequently, at block 230, transfer of memory of the VM is started as part of the live migration process.

At block 240, capacity of a network channel on which the VM is migrated is determined. In one embodiment, the capacity is determined by round trip message time measurements on the channel. In some embodiments, the capacity is based on a mean and standard deviation of the multiple round trip time measurements. In other embodiments, the capacity is a known parameter that is stored at the source host machine or at the migration agent. At block 250, a number of memory pages to be left when the VM is stopped as part of the live migration process is determined. The number of memory pages left is based on the specified maximum downtime of block 220 and the determined network channel capacity of block 240.

During the live migration of the VM, when the determined number of memory pages left to be transferred it reached, then the VM is stopped and the remaining memory pages are transferred at block 260. Subsequently, the live migration of the VM is completed by finalizing the transfer of the VM to the destination host machine.

Figure 3:
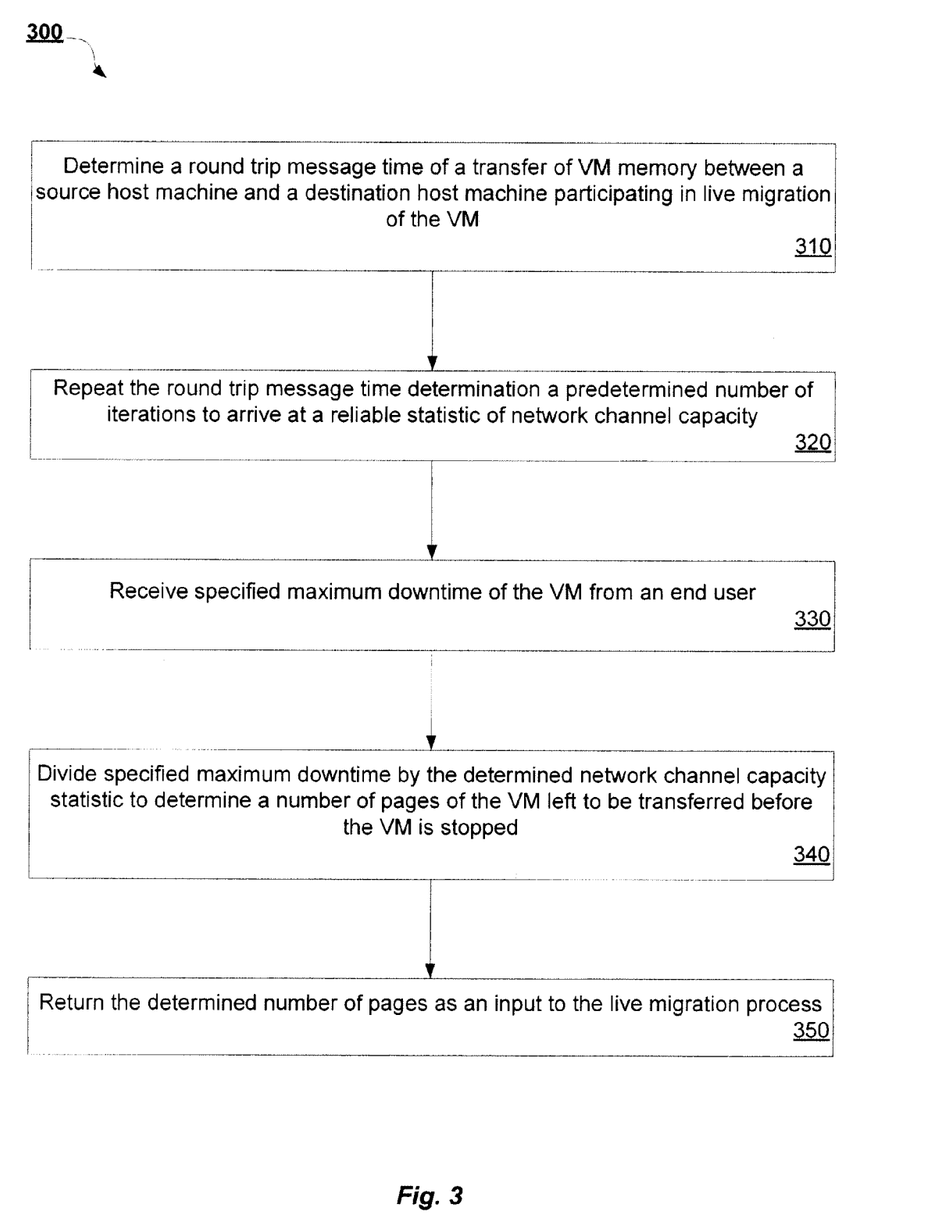
FIG. 3 is a flow diagram illustrating a method for determining a VM stop point as part of the live migration of the VM over a network channel with a deterministic bounded tunable downtime according to an embodiment of the invention.

FIG. 3 is a flow diagram illustrating a method 300 for determining a VM stop point as part of the live migration of the VM over a network channel with a deterministic bounded tunable downtime according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by migration agent 107 or migration agent 117 of FIG. 1.

Method 300 begins at block 310 where a round trip message time of a transfer of VM memory between a source host machine and a destination host machine participating in live migration of the VM is determined. In some embodiments, the round trip message time may be measured from the initial transfer of memory taking place as part of the live migration process. Then, at block 320, the round trip message time measurement is repeated a predetermined number of iterations in order to arrive at a reliable statistic of network channel capacity. In the case of a reliable channel, the maximum measurement will act as the upper bound for the capacity of the network channel. In cases of an unreliable channel, this will mean determining a mean and standard deviation of the multiple measurements to arrive at the capacity statistic.

Subsequently, at block 330, a specified maximum downtime of the VM is received from an end user. In some embodiments, this downtime statistic is specified by the end user via an interface provided to the end user by a migration agent handling the live migration. At block 340, the number of pages of the VM left to be transferred when the VM is stopped during the live migration process is determined. The number of pages left is determined by dividing the specified maximum downtime by the determined network channel capacity statistic. Lastly, at block 350, the determined number of pages left is returned as an input to the live migration process in order to provide a guaranteed (or highly guaranteed) tunable downtime of the VM during the live migration process for the end user.

Figure 4:
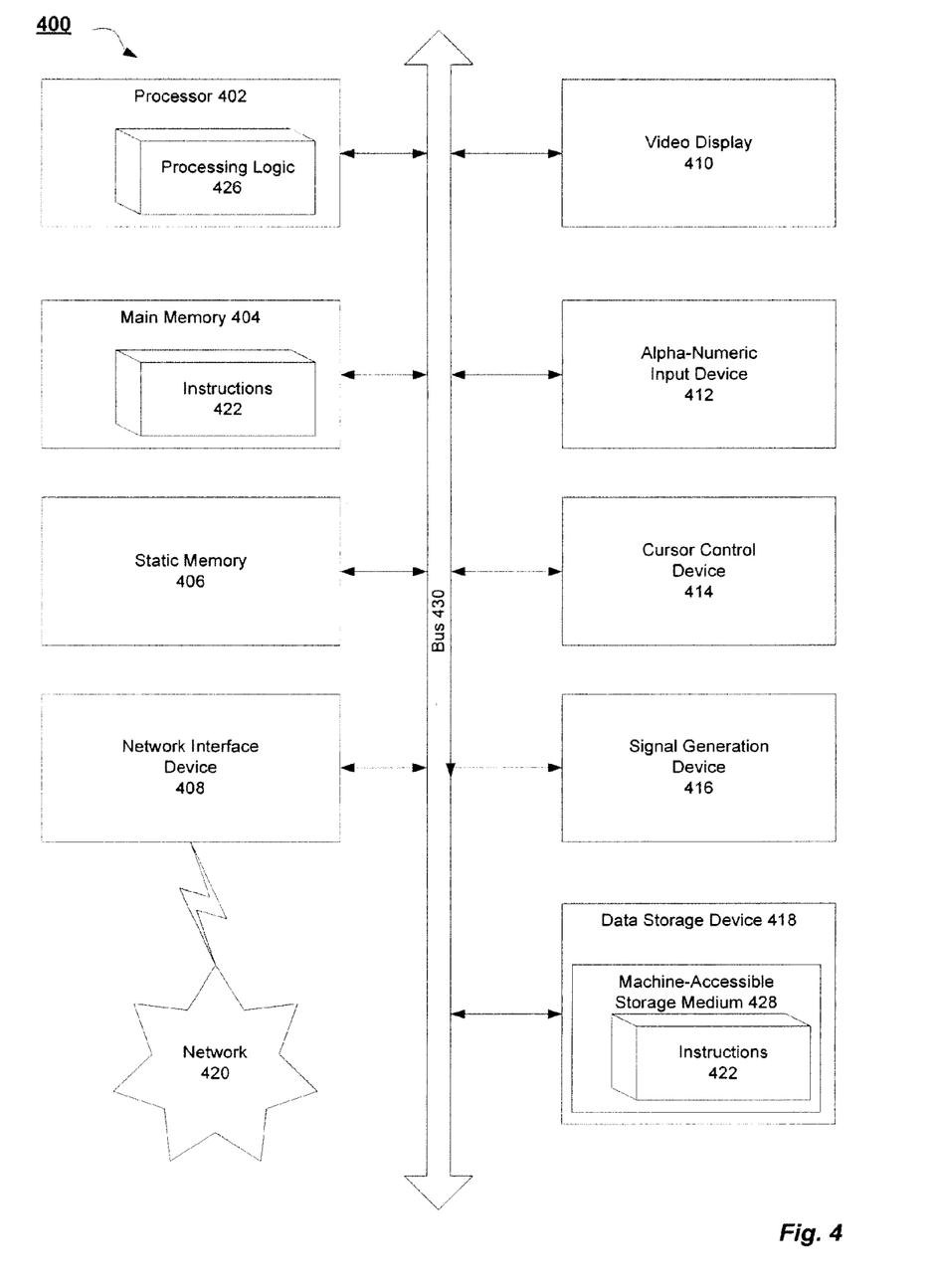
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform guaranteeing deterministic bounded tunable downtime for live migration of VMs over reliable channels by source host machine 110 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform method 200 for guaranteeing deterministic bounded tunable downtime for live migration of VMs over reliable channels described with respect to FIG. 2, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:

receiving, by a processing device of a source host machine from an end user, a value of a maximum downtime of a virtual machine (VM) that can occur during a live migration of the VM from the source host machine to a destination host machine;

determining, by the source host machine during the live migration of the VM, a capacity of a network channel hosting the live migration of the VM to the destination host machine;

calculating, by the source host machine, a number of memory pages of the VM that are not to be transferred to the destination host machine as part of the live migration of the VM before the VM is stopped, wherein the calculating of the number of memory pages is in view of the received value of the maximum downtime and the determined capacity of the network channel during the live migration;

stopping, by the source host machine, the VM when a number of memory pages remaining to be transferred as part of the live migration is equal to the calculated number of memory pages; and transferring, by the source host machine while the VM is stopped, the memory pages remaining to be transferred to the destination host machine.

2. The method of claim 1, further comprising initiating the live migration of the VM when a trigger event associated with the VM occurs.

3. The method of claim 1, wherein the stopping the VM guarantees a stopping time of the VM will not exceed the specified value of the maximum downtime if the network channel is reliable.

4. The method of claim 1, wherein the determining the capacity of the network channel further comprises measuring a round trip message time of a memory transfer of the VM between the source host machine and the destination host machine over the network channel.

5. The method of claim 4, wherein the determining the capacity of the network channel further comprises:
repeating the measuring for multiple iterations of memory transfers; and
calculating a mean and a standard deviation of a result of the multiple iteration measurements.

6. The method of claim 5, wherein the stopping the VM guarantees with a high probability that a stopping time of the VM will not exceed the specified maximum downtime if the network channel is not reliable.

7. The method of claim 1, wherein the determining the capacity of the network channel further comprises accessing configuration information of the network channel that is stored at the source host machine.

8. The method of claim 1, wherein the value of the maximum downtime from the end user is received via an interface provided to the end user by the source host machine.

9. A system, comprising:
a memory;
a processing device communicably coupled to the memory; and
a migration agent executable from the memory and the processing device, the migration agent to:
receive a value of a maximum downtime of a virtual machine (VM) that can occur during a live migration of the VM from a source host machine to a destination host machine;
determine, during the live migration of the VM, a capacity of a network channel hosting the live migration of the VM to the destination host machine;
calculate a number of memory pages of the VM that are not to be transferred to the destination host machine as part of the live migration of the VM before the VM is stopped, wherein the calculating of the number of memory pages is in view of the received value of the maximum downtime and the determined capacity of the network channel during the live migration;
stop the VM when a number of memory pages remaining to be transferred as part of the live migration is equal to the calculated number of memory pages; and
transfer, while the VM is stopped, the memory pages remaining to be transferred to the destination host machine.

10. The system of claim 9, wherein the migration agent to stop the VM guarantees a stopping time of the VM will not exceed the specified value of the maximum downtime if the network channel is reliable.

11. The system of claim 9, wherein the migration agent to determine the capacity of the network channel further comprises the migration agent to measure a round trip message time of a memory transfer of the VM between the source host machine and the destination host machine over the network channel.

12. The system of claim 11, wherein the migration agent to determine the capacity of the network channel further comprises the migration agent to:
repeat the measuring for multiple iterations of memory transfers; and
calculate a mean and a standard deviation of a result of the multiple iteration measurements.

13. The system of claim 12, wherein the migration agent to stop the VM guarantees with a high probability that a stopping time of the VM will not exceed the specified maximum downtime if the network channel is not reliable.

14. The system of claim 9, wherein the migration agent to determine the capacity of the network channel further comprises the migration agent to access configuration information of the network channel that is stored at the source host machine.

15. The system of claim 9, wherein the value of the maximum downtime from the end user is received via an interface provided to an end user by the source host machine.

16. A non-transitory machine-readable storage medium including instructions that, when accessed by a processing device, cause the processing device to perform operations comprising:
receiving, by the processing device of a source host machine from an end user, a value of a maximum downtime of a virtual machine (VM) that can occur during a live migration of the VM from the source host machine to a destination host machine;
determining, by the source host machine during the live migration of the VM, a capacity of a network channel hosting the live migration of the VM to the destination host machine;
calculating, by the source host machine, a number of memory pages of the VM that are not to be transferred to the destination host machine as part of the live migration of the VM before the VM is stopped, wherein the calculating of the number of memory pages is in view of the received value of the maximum downtime and the determined capacity of the network channel during the live migration;
stopping, by the source host machine, the VM when a number of memory pages remaining to be transferred as part of the live migration is equal to the calculated number of memory pages; and
transferring, by the source host machine while the VM is stopped, the memory pages remaining to be transferred to the destination host machine.

17. The non-transitory machine-readable storage medium of claim 16, wherein the stopping the VM guarantees a stopping time of the VM will not exceed the specified value of the maximum downtime if the network channel is reliable.

18. The non-transitory machine-readable storage medium of claim 16, wherein the determining the capacity of the network channel further comprises measuring a round trip message time of a memory transfer of the VM between the source host machine and the destination host machine over the network channel.

19. The non-transitory machine-readable storage medium of claim 18 wherein the determining the capacity of the network channel further comprises:

repeating the measuring for multiple iterations of memory transfers; and calculating a mean and a standard deviation of a result of the multiple iteration measurements.

20. The non-transitory machine-readable storage medium of claim 16, wherein the determining the capacity of the network channel further comprises accessing configuration information of the network channel that is stored at the source host machine.

\* \* \* \* \*